(12) United States Patent
Alsolami et al.

(10) Patent No.: US 11,478,777 B2
(45) Date of Patent: *Oct. 25, 2022

(54) CATALYST COMPOSITIONS HAVING ENHANCED ACIDITY FOR DRY REFORMING PROCESSES

(71) Applicant: Saudi Arabian Oil Company, Dhahran (SA)

(72) Inventors: Bandar H. Alsolami, Dhahran (SA); Bandar A. Fadhel, Dhahran (SA); Rami Bamagain, Dhahran (SA); Mohammed A. Albuali, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 255 days.

This patent is subject to a terminal disclaimer.

(21) Appl. No.: 16/775,135

(22) Filed: Jan. 28, 2020

(65) Prior Publication Data
US 2021/0229074 A1 Jul. 29, 2021

(51) Int. Cl.
| | | |
|---|---|---|
| B01J 21/16 | (2006.01) | |
| B01J 23/883 | (2006.01) | |
| B01J 35/02 | (2006.01) | |
| B01J 35/10 | (2006.01) | |
| B01J 37/00 | (2006.01) | |
| B01J 37/02 | (2006.01) | |
| B01J 37/03 | (2006.01) | |
| B01J 37/04 | (2006.01) | |
| B01J 37/08 | (2006.01) | |
| C01B 3/40 | (2006.01) | |

(52) U.S. Cl.
CPC ............ *B01J 21/16* (2013.01); *B01J 23/883* (2013.01); *B01J 35/023* (2013.01); *B01J 35/026* (2013.01); *B01J 35/1014* (2013.01); *B01J 37/009* (2013.01); *B01J 37/0036* (2013.01); *B01J 37/0236* (2013.01); *B01J 37/035* (2013.01); *B01J 37/04* (2013.01); *B01J 37/088* (2013.01); *C01B 3/40* (2013.01); *C01B 2203/0238* (2013.01); *C01B 2203/1058* (2013.01); *C01B 2203/1082* (2013.01); *C01B 2203/1241* (2013.01)

(58) Field of Classification Search
CPC ........ B01J 21/16; B01J 23/883; B01J 35/023; B01J 35/1014; B01J 37/0036; B01J 37/009; B01J 37/0236; B01J 37/035; B01J 37/04; B01J 37/088; C01B 3/40; C01B 2203/0238; C01B 2203/1058; C01B 2203/1082; C01B 2203/1241
USPC ...................................................... 252/373
See application file for complete search history.

(56) References Cited

U.S. PATENT DOCUMENTS

| | | | |
|---|---|---|---|
| 3,186,797 A | 5/1965 | Perrett et al. | |
| 4,017,425 A | 4/1977 | Shiao | |
| 4,451,578 A | 5/1984 | Setzer et al. | |
| 5,525,322 A | 6/1996 | Willms | |
| 6,340,437 B1 | 1/2002 | Vagi et al. | |
| 10,179,326 B2 | 1/2019 | Basset et al. | |
| 2003/0024806 A1 | 2/2003 | Foret | |
| 2005/0221977 A1 | 10/2005 | Fukunaga et al. | |
| 2006/0216227 A1* | 9/2006 | Idem | B01J 37/03 423/651 |
| 2011/0027674 A1 | 2/2011 | Sato et al. | |
| 2012/0273728 A1 | 11/2012 | Abatzoglou et al. | |
| 2013/0206606 A1 | 8/2013 | Gilliam et al. | |
| 2014/0369907 A1 | 12/2014 | Boudreault et al. | |
| 2015/0246342 A1* | 9/2015 | Nagashima | B01J 37/0236 502/328 |
| 2016/0129423 A1 | 5/2016 | Basset et al. | |
| 2016/0367970 A1* | 12/2016 | Goyal | B01J 23/002 |
| 2019/0300364 A1 | 10/2019 | Weiss et al. | |
| 2019/0308183 A1 | 10/2019 | Agblevor et al. | |

FOREIGN PATENT DOCUMENTS

| | | |
|---|---|---|
| CN | 104627960 A | 5/2015 |
| CN | 105478120 A | 4/2016 |
| CN | 107433200 A | 12/2017 |
| CN | 105170155 B | 5/2018 |
| CN | 111097441 * | 5/2020 |
| GB | 714284 A | 8/1954 |
| GB | 916216 A | 1/1963 |
| JP | S60203694 A | 10/1985 |
| JP | 2007084389 A | 4/2007 |
| RU | 2542177 C1 | 2/2015 |
| WO | 0000285 A1 | 1/2000 |

(Continued)

OTHER PUBLICATIONS

Machine translation of CN111097441 downloaded Dec. 2, 2021, pp. 1-9 (Year: 2020).*
International Search Report and Written Opinion for PCT Application No. PCT/US2021/015132 (SA51396) dated Mar. 29, 2021: pp. 1-12.
International Search Report and Written Opinion for PCT Application No. PCT/US2021/015133 (SA51397) dated Mar. 29, 2021: pp. 1-12.
International Search Report and Written Opinion for PCT Application No. PCT/US2021/015134 (SA51398) dated Mar. 29, 2021: pp. 1-12.
International Search Report and Written Opinion for PCT Application No. PCT/US2021/015188 (SA51444) dated Mar. 29, 2021: pp. 1-11.

(Continued)

*Primary Examiner* — Douglas B Call
(74) *Attorney, Agent, or Firm* — Bracewell LLP; Constance G. Rhebergen; Eleanor L. Tyson

(57) ABSTRACT

Modified red mud catalyst compositions, methods for production, and methods for use, a composition including red mud material produced from an alumina extraction process from bauxite ore; nickel oxide, the nickel oxide present at between about 5 wt. % to about 40 wt. % of the modified red mud catalyst composition; and a Periodic Table Group VIB metal oxide, the Group VIB metal oxide present at between about 1 wt. % and about 30 wt. % of the modified red mud catalyst composition.

32 Claims, 2 Drawing Sheets

(56) References Cited

FOREIGN PATENT DOCUMENTS

| WO | 2010118133 A1 | 10/2010 |
|---|---|---|
| WO | 2019138002 A1 | 7/2019 |

OTHER PUBLICATIONS

International Search Report and Written Opinion for PCT Application No. PCT/US2021/015191 (SA51445) dated Mar. 29, 2021: pp. 1-11.
International Search Report and Written Opinion for PCT Application No. PCT/US2021/015194 (SA51446) dated Mar. 29, 2021: pp. 1-12.
International Search Report and Written Opinion for PCT Application No. PCT/US2021/015196 (SA51447) dated Apr. 14, 2021: pp. 1-11.
International Search Report and Written Opinion for PCT Application No. PCT/US2021/015303 (SA51448) dated Mar. 30, 2021: pp. 1-12.
International Search Report and Written Opinion for PCT Application No. PCT/US2021/015307 (SA51449) dated Mar. 31, 2021: pp. 1-11.
International Search Report and Written Opinion for PCT Application No. PCT/US2021/015370 (SA51450) dated Apr. 14, 2021: pp. 1-11.
International Search Report and Written Opinion for PCT Application No. PCT/US2021/015371 (SA51451) dated Mar. 31, 2021: pp. 1-11.
Cheng et al., "Tar Elimination from Biomass Gasification Syngas with Bauxite Residue Derived Catalysts and Gasification Char," Applied Energy, vol. 258, Nov. 26, 2019: pp. 1-18.
Das et al., "A Review on Advances in Sustainable Energy Production through Various Catalytic Processes by using Catalysts Derived from Waste Red Mud," Renewable Energy, vol. 143, May 31, 2019: pp. 1791-1811.
Duman et al., "Hydrogen Production from Algal Biomass via Steam Gasification," Bioresource Technology, vol. 166, May 5, 2014: pp. 24-30.
Ebrahiminejad et al., "Hydrocracking and Hydrodesulfurization of Diesel over Zeolite Beta-Containing NiMo Supported on Activated Red Mud," Advanced Powder Technology, vol. 30(8), May 17, 2019: pp. 1450-1461.
Jahromi et al., "Hydrodeoxygenation of Aqueous-Phase Catalytic Pyrolysis Oil to liquid Hydrocarbons Using Multifunctional Nickel Catalyst," Ind. Eng. Chem. Res., vol. 57(39), Sep. 7, 2018: pp. 13257-13268.
Mathur et al., "Ore Catalysts in Two-Stage Coal Liquefaction," Fuel, vol. 65(6), Jun. 1, 1986: pp. 790-796.
Paredes et al., "Catalytic Combustion of Methane over Red Mud-Based Catalysts," Applied Catalysis B: Environmental, vol. 47, Jan. 1, 2004: pp. 37-45.
Alharthi et al., "Hydrocarbon Cracking Over Red Mud and Modified Red Mud Samples," Journal of Sustainable Metallurgy 2:387-393, 2016.
Balakrishnan et al., "Hydrogen production from methane in the presence of red mud—making mud magnetic," Green Chemistry, 11, 42-47, 2009.
Balakrishnan et al., "Waste materials—catalytic opportunities: an overview of the application of large scale waste materials as resources for catalytic applications," Green Chemistry, 2011, 13, 16.
Bennett et al., "Catalytic Applications of Waste Derived Materials", Journal of Materials Chemistry A, pp. 1-22, 2013.
Dulger Irdem et al. "Steam Reforming of Tar Derived from Walnut Shell and Almond Shell Gasification on Red Mud and Iron-Ceria Catalysts", Energy&Fuels, 2014.
Fang et al., "A Nanomesoporous Catalyst from Modified Red Mud and Its Application for Methane Decomposition to Hydrogen Production," Journal of Nanomaterials, Hindawi, 2016.
Liu et al., "Preparation of Modified Red Mud-Supported Fe Catalysts for Hydrogen Production by Catalytic Methane Decomposition," Journal of Nanomaterials, Article ID 8623463, 2017.
Ortiz et al. "Hydrogen production with CO2 capture by coupling steam reforming of methane and chemical-looping combustion: Use of an iron-based waste product as oxygen carrier burning a PSA tail gas," Journal of Power Sources, 196, pp. 4370-4381, 2011.
Smiciklas et al., "Effect of acid treatment on red mud properties with implications on Ni(II) sorption and stability", Chemical Engineering Journal, 242, 2014, pp. 27-35.
International Search Report and Written Opinion of PCT Application No. PCT/US2021/015131 (SA51395) dated May 11, 2021: pp. 1-12.
Theofanidis et al., "Enhanced carbon-resista nt dry reforming Fe—Ni catalyst: Role of Fe," ACS Catal., vol. 5(5), May 26, 2015: pp. 3028-3039.
U.S. Appl. No. 16/775,019, "Nickel-Containing Catalyst Composition Having Enhanced Acidity for Dry Reforming Processes", filed Jan. 28, 2020, (SA51395).
U.S. Appl. No. 16/775,035, "Nickel-Containing Catalyst Composition Having Enhanced Acidity for Steam Reforming Processes", filed Jan. 28, 2020, (SA51396).
U.S. Appl. No. 16/775,050, "Nickel-Containing Catalyst Composition Having Enhanced Acidity for Autothermal Reforming Processes", filed Jan. 28, 2020, (SA51397).
U.S. Appl. No. 16/775,063, "Nickel-Containing Catalyst Composition Having Enhanced Acidity for Bi-Reforming Processes", filed Jan. 28, 2020, (SA51398).
U.S. Appl. No. 16/775,081, "Catalyst Carrier for Dry Reforming Processes", filed Jan. 28, 2020, (SA51444).
U.S. Appl. No. 16/775,096, "Catalyst Carrier for Steam Reforming Processes", filed Jan. 28, 2020, (SA51445).
U.S. Appl. No. 16/775,102, "Catalyst Carrier for Autothermal Reforming Processes", filed Jan. 28, 2020, (SA51446).
U.S. Appl. No. 16/775,119, "Catalyst Carrier for Bi-Reforming Processes", filed Jan. 28, 2020, (SA51447).
U.S. Appl. No. 16/775,147, "Catalyst Compositions Having Enhanced Acidity for Steam Reforming Processes", filed Jan. 28, 2020, (SA51449).
U.S. Appl. No. 16/775,158, "Catalyst Compositions Having Enhanced Acidity for Autothermal Reforming Processes", filed Jan. 28, 2020, (SA51450).
U.S. Appl. No. 16/775,167, "Catalyst Compositions Having Enhanced Acidity for Bi-Reforming Processes", filed Jan. 28, 2020, (SA51451).
George A. Olah, et al., "Bi-reforming of Methane from Any Source with Steam and Carbon Dioxide Exclusively to Mietgas (CO—2H2) for Methanol and Hydrocarbon Synthesis", ACS Publications, JACS, 2013, V135, pp. 648-650.

* cited by examiner

CATALYST COMPOSITIONS HAVING ENHANCED ACIDITY FOR DRY REFORMING PROCESSES

BACKGROUND

Field

Embodiments of the disclosure relate to catalyst compositions for use in reforming processes. In particular, certain embodiments of the disclosure relate to Periodic Table Group VIB metal oxide containing catalyst compositions for and methods of dry reforming.

Description of the Related Art

Dry reforming simultaneously utilizes two greenhouse gases, $CH_4$ and $CO_2$, to produce synthesis (syn) gas (CO and $H_2$). However, one challenge of dry reforming is the lack of available, durable, and cost-effective catalyst. Dry reforming generally applies a catalyst, increased temperature, and increased pressure in a process generally according to Equation 1.

$$CH_4+CO_2 \rightarrow 2H_2+2CO \qquad \text{Eq. 1}$$

Dry reforming generally is not as common as steam reforming, and one use is in processes that require a high proportion of CO versus $H_2$ in the produced synthesis gas. The thermodynamics of dry reforming are similar to those of steam reforming. One difference of dry reforming from steam reforming is dry reforming's tendency for coking, increased by a lack of steam to remove carbon deposits. In some applications like mixed reforming or bi-reforming (a combination of steam and dry reforming), steam is added for effective reduction or removal of coke. Since coking can quickly deactivate Ni catalysts, Rh and Ru catalysts are used in some dry reforming applications.

Present catalyst technology is insufficient in some processes to provide cost-effective means for dry reforming.

SUMMARY

Applicant has recognized a need for compositions of Periodic Table Group VIB (Group VIB) metal oxide containing modified red mud to be applied in systems and processes for dry reforming. Enhanced-acidity Group VIB catalyst compositions are disclosed, in some embodiments further including nickel. The enhanced-acidity Group VIB catalysts also contain in some embodiments Fe, Al, Si, Na, Ca, and Ti oxides from red mud. In embodiments of the present disclosure, red mud acts as a catalyst in addition to or alternative to a catalyst carrier. Disclosed compositions are useful as a catalyst in dry reforming processes for the conversion of methane to syngas, according to Equation 1. Utilization of red mud in dry reforming processes provides the concurrent advantages of utilizing a waste material (red mud), converting $CO_2$ (a greenhouse gas), and producing $H_2$.

Red mud is a caustic waste material produced from bauxite ore processing for alumina extraction, and is utilized here as a catalyst for a dry reforming process. Surprisingly and unexpectedly, without being specifically designed as a catalyst (for example using specific zeolitic structure), red mud waste material can be readily modified for use as a catalyst. Dry reforming is considered to be a green method for the production of syngas ($H_2$ and CO), since it utilizes as reactants two greenhouse gases, $CH_4$ and $CO_2$. Despite that, widespread adoption of dry reforming processes has been stymied due in part to the lack of commercially-available durable and efficient catalysts. Red mud generally includes a mixture of transition metals such as Ti, Fe, and Al, which make it an advantageous catalyst for dry reforming processes, for example once modified with nickel and molybdenum.

Embodiments disclosed here apply red mud as an active catalyst support, promotor, in addition to or alternative to catalyst to produce hydrogen through dry reforming of methane.

Therefore, disclosed here is a modified red mud catalyst composition including red mud material produced from an alumina extraction process from bauxite ore; nickel oxide, the nickel oxide present at between about 5 wt. % to about 40 wt. % of the modified red mud catalyst composition; and a Periodic Table Group VIB metal oxide, the Group VIB metal oxide present at between about 1 wt. % and about 30 wt. % of the modified red mud catalyst composition. In some embodiments, the Group VIB metal oxide comprises at least one metal selected from the group consisting of: chromium, molybdenum, and tungsten. In other embodiments, the composition includes at least one component selected from the group consisting of: $Fe_2O_3$, $Al_2O_3$, $SiO_2$, $Na_2O$, CaO, and $TiO_2$. Still in other embodiments, a majority of the particles of the composition have a particle size of less than about 70 In certain other embodiments, the nickel oxide is present at between about 10 wt. % to about 30 wt. % of the modified red mud catalyst composition. Still in other embodiments, the nickel oxide is present at between about 15 wt. % to about 25 wt. % of the modified red mud catalyst composition. In some embodiments, the nickel oxide is present at about 23 wt. % of the modified red mud catalyst composition.

In other embodiments of the composition, the Group VIB metal oxide is present at between about 1 wt. % to about 20 wt. % of the modified red mud catalyst composition. In some embodiments, the Group VIB metal oxide is present at between about 1 wt. % to about 10 wt. % of the modified red mud catalyst composition. Still in other embodiments, the Group VIB metal oxide is present at about 5 wt. % of the modified red mud catalyst composition. In yet other embodiments, the Brunauer-Emmett-Teller (BET) surface area of the modified red mud catalyst composition is between about 50 $m^2/g$ and about 90 $m^2/g$.

Additionally disclosed here are methods for producing the modified red mud catalyst compositions, one method including dissolving red mud material produced from an alumina extraction process from bauxite ore in water to produce a red mud solution; neutralizing the pH of the red mud solution using an acid; preparing a nickel-containing solution; preparing a Periodic Table Group VIB metal oxide-containing solution; mixing the red mud solution, the nickel-containing solution, and the Group VIB metal oxide-containing solution to precipitate the modified red mud catalyst composition; and calcining the modified red mud catalyst composition. In some embodiments, the Group VIB metal oxide comprises at least one metal selected from the group consisting of: chromium, molybdenum, and tungsten. Still in other embodiments, the water comprises deionized water. In certain embodiments, the acid comprises hydrochloric acid.

In some other embodiments of the methods, the nickel-containing solution comprises nickel nitrate dissolved in ethanol. Still in other embodiments, the Group VIB metal oxide-containing solution comprises ammonium molybdate dissolved in ethanol. In yet other embodiments, the method includes filtering the modified red mud catalyst composition and drying the modified red mud catalyst composition before the step of calcining. In some embodiments, the step of drying occurs at about 100° C. Still in other embodiments, the step of calcining takes place for about 4 hours at between about 500° C. to about 700° C. In yet other embodiments, the step of calcining takes place for about 4 hours at about 600° C. Still in yet other embodiments, the method includes the step of grinding the modified red mud catalyst composition to a particle size of less than about 70 μm. In some embodiments, the BET surface area of the modified red mud catalyst composition is between about 50 m$^2$/g and about 90 m$^2$/g.

Additionally disclosed here is a method for dry reforming over a modified red mud catalyst composition, the method including providing a methane feed and carbon dioxide feed to react over the modified red mud catalyst composition at increased temperature and increased pressure to produce synthesis gas comprising H$_2$ and CO, the composition comprising: red mud material produced from an alumina extraction process from bauxite ore; nickel oxide, the nickel oxide present at between about 5 wt. % to about 40 wt. % of the modified red mud catalyst composition; and a Periodic Table Group VIB metal oxide, the Group VIB metal oxide present at between about 1 wt. % and about 30 wt. % of the modified red mud catalyst composition.

In some embodiments, the Group VIB metal oxide comprises at least one metal selected from the group consisting of: chromium, molybdenum, and tungsten. Still in other embodiments, the increased temperature is between about 500° C. to about 1000° C. In some embodiments, the increased temperature is between about 600° C. to about 800° C. In other embodiments, the increased temperature is about 750° C. In certain embodiments, the increased pressure is between about 5 bar and about 20 bar. In other embodiments, the increased pressure is between about 10 bar and about 15 bar. Still in other embodiments, the increased pressure is about 14 bar. In yet other embodiments, the methane conversion rate is at least about 14% for at least about 6 hours. In yet other embodiments, gas hourly space velocity of the methane feed and carbon dioxide feed mixed is between about 1000 h$^{-1}$ to 10000 h$^{-1}$. Still in other embodiments, the composition includes at least one component selected from the group consisting of: Fe$_2$O$_3$, Al$_2$O$_3$, SiO$_2$, Na$_2$O, CaO, and TiO$_2$. In certain embodiments, a majority of the particles of the composition have a particle size of less than about 70 μm. And in other embodiments, the nickel oxide is present at between about 10 wt. % to about 30 wt. % of the modified red mud catalyst composition.

Still in other embodiments, the nickel oxide is present at between about 15 wt. % to about 25 wt. % of the modified red mud catalyst composition. In certain embodiments, the nickel oxide is present at about 23 wt. % of the modified red mud catalyst composition. In some embodiments, the Group VIB metal oxide is present at between about 1 wt. % to about 20 wt. % of the modified red mud catalyst composition. Still in other embodiments, the Group VIB metal oxide is present at between about 1 wt. % to about 10 wt. % of the modified red mud catalyst composition. In certain embodiments, the Group VIB metal oxide is present at about 5 wt. % of the modified red mud catalyst composition. In certain other embodiments, a molar ratio of the methane feed to the carbon dioxide feed is between about 1:1 and about 1:1.75. In some embodiments, produced H$_2$ is at least about 9 mol. % of produced products from the reaction. And in other embodiments, the BET surface area of the modified red mud catalyst composition is between about 50 m$^2$/g and about 90 m$^2$/g.

In some embodiments of the compositions and methods described, modified red mud catalyst compositions with nickel in addition to or alternative to molybdenum or other metals include between about 15 wt. % and about 30 wt. % Al$_2$O$_3$, between about 1 wt. % and about 5 wt. % CaO, between about 10 wt. % and about 30 wt. % Fe$_2$O$_3$, between about 1 wt. % and about 5 wt. % Na$_2$O, between about 10 wt. % and about 25 wt. % SiO$_2$, and between about 1 wt. % and about 10 wt. % TiO$_2$.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
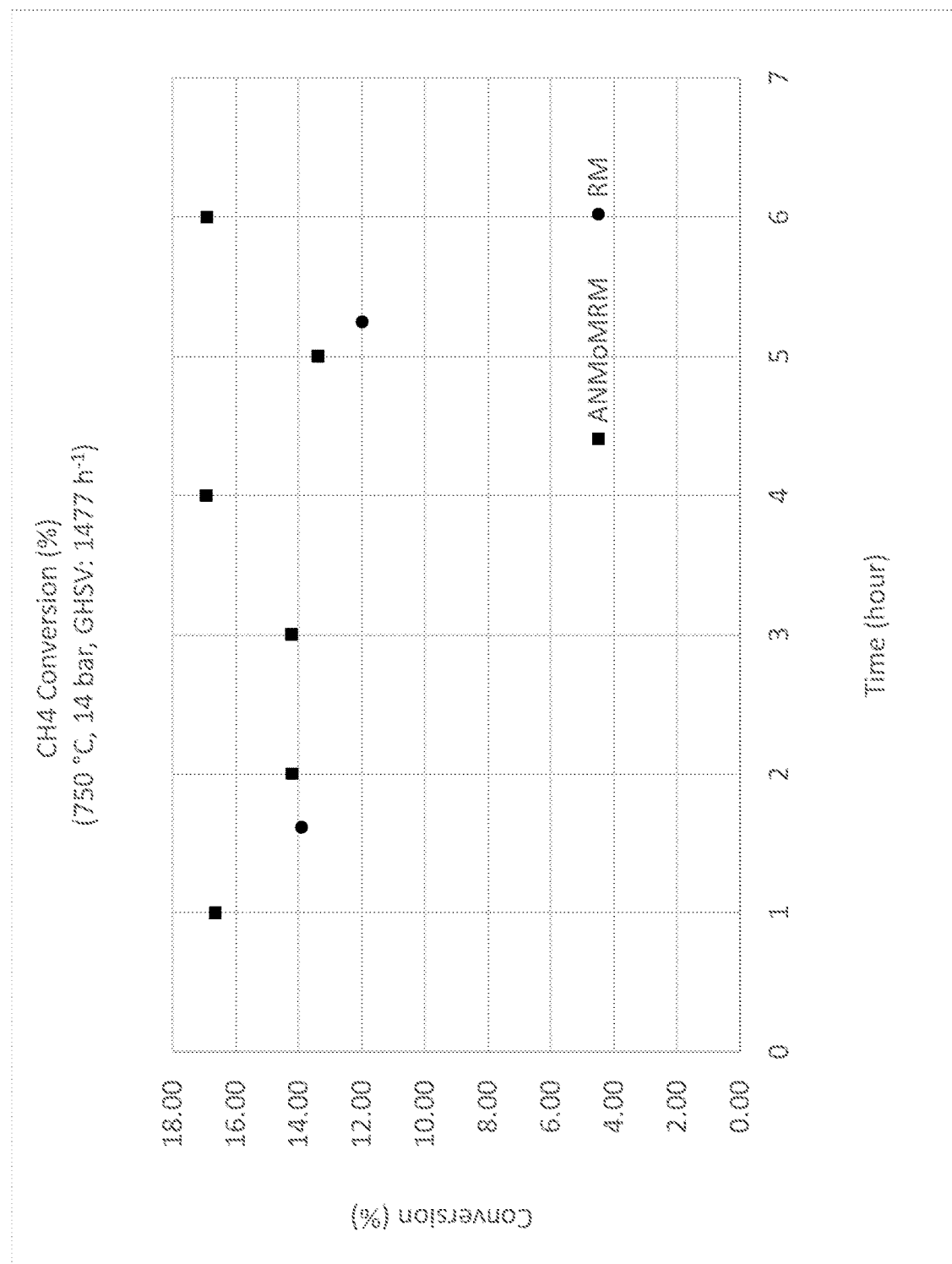
FIG. 1 is a graph showing conversion percentage for CH$_4$ in a dry reforming process for unmodified red mud (RM) used as a catalyst and for acid nickel-molybdenum-modified red mud (ANMoMRM) used as a catalyst.

So that the manner in which the features and advantages of the embodiments of compositions of Group VIB metal modified red mud, in some embodiments including nickel, along with systems and methods for dry reforming with such compositions and for producing such compositions, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

As noted, red mud is a caustic waste material generated during alumina extraction from bauxite ore. Red mud includes a mixture of transition metals, for example as listed in Table 1.

TABLE 1

Example composition ranges for global red mud.

| Component | Fe$_2$O$_3$ | Al$_2$O$_3$ | SiO$_2$ | Na$_2$O | CaO | TiO$_2$ |
|---|---|---|---|---|---|---|
| Approx. Weight Percentage | 30-60% | 10-20% | 3-50% | 2-10% | 2-8% | 10% |

Red mud was modified with nickel and molybdenum to be utilized and tested as a catalyst for dry reforming as follows. In some embodiments, nickel is not required. In some embodiments, nickel in addition to or alternative to any one of or any combination of chromium, molybdenum, and tungsten can be used to modify red mud. Saudi Arabian red mud from Ma'aden Aluminium Company, based at Ras Al Khair, Saudi Arabia was used to prepare a modified catalyst composition. Table 2 shows the weight percent for certain components in the unmodified Saudi Arabian red mud composition.

TABLE 2

Certain component weight percentages in Saudi Arabian red mud (RM) catalyst/catalyst support composition.

| Component | $Fe_2O_3$ | $Al_2O_3$ | $SiO_2$ | $Na_2O$ | CaO | $TiO_2$ |
|---|---|---|---|---|---|---|
| Weight Percentage | 18.75% | 25.22% | 18.88% | 11.77% | 7.97% | 6.89% |

The untreated red mud exhibited a Brunauer-Emmett-Teller (BET) surface area of about 16 $m^2/g$.

Table 3 shows an example composition for one embodiment of produced nickel-molybdenum acid treated red mud for use as a modified catalyst. The unmodified red mud used as a catalyst precursor contained no detectable nickel or molybdenum.

TABLE 3

Example composition for a produced ANMoMRM used as a catalyst.

| Component | $Fe_2O_3$ | $Al_2O_3$ | $SiO_2$ | $Na_2O$ | CaO | $TiO_2$ | NiO | MoO |
|---|---|---|---|---|---|---|---|---|
| Weight Percentage | 16.76% | 21.43% | 19.56% | 2.81% | 2.76% | 5.36% | 23.7% | 5.06% |

Because red mud is a highly variable waste material, elemental composition will vary between samples and test results.

Catalyst Preparation. An acid nickel-molybdenum-modified red mud (ANMoMRM) catalyst with 23.7 wt. % nickel oxide and 5.06 wt. % molybdenum oxide was prepared using a homogeneous precipitation process. Using an unmodified red mud catalyst precursor, 20 wt. % of nickel oxide (also referred to as NiO) was targeted to be loaded in the red mud to enhance dry reforming activity, and 23.7 wt. % of nickel oxide was confirmed by X-ray fluorescence (XRF) analysis. Using the unmodified red mud catalyst precursor, 5 wt. % of molybdenum oxide (also referred to as MoO) was targeted to be loaded in the red mud to enhance dry reforming activity, and 5.06 wt. % of molybdenum oxide was confirmed by XRF analysis. Depending on the catalyst application, nickel oxide can be loaded to a red mud precursor from between about 1 wt. % to about 50 wt. %, and molybdenum oxide, in addition to or alternative to other Group VIB metals, can be loaded to a red mud precursor from between about 1 wt. % to about 50 wt. %.

First, 10 g of Saudi Arabian red mud from Ma'aden Aluminium Company, based at Ras Al Khair, Saudi Arabia was modified by dissolving dried, unmodified red mud in 100 mL of deionized water, and then the pH was neutralized using 40.5 mL of 37 wt. % hydrochloric acid. Afterward, 10 g of nickel(II) nitrate hexahydrate was dissolved in 50 mL of ethanol. Then, 0.92 grams of ammonium molybdate tetrahydrate was dissolved in 50 mL of ethanol. The three separate solutions were mixed to form a mixed solution. Next, the mixed solution was filtered, filtered solids were dried in an oven at 105° C., and then calcined at 600° C. for 4 hours. The final ANMoMRM solid product was ground to have a particle size of less than about 70 The step of drying in an oven can last from about 2 to about 24 hours.

Other nickel-containing compounds and molybdenum-containing compounds can be used in addition to or alternative to nickel nitrate and ammonium molybdate, including any nickel-containing compounds or molybdenum-containing compounds soluble in ethanol or other organic or inorganic alcohols, or in aqueous ammonia. XRF in embodiments of the present disclosure confirmed the presence of nickel and molybdenum oxide loading in the ANMoMRM. Nickel can be combined with red mud to result in nickel(II) oxide, NiO, in addition to or alternative to nickel(III) oxide, $Ni_2O_3$. Molybdenum can be combined with red mud to result in (molybdenum dioxide, $MoO_2$) or Molybdenum(VI) oxide (molybdenum trioxide, $MoO_3$).

BET surface area analysis showed unmodified red mud surface area was about 16 $m^2/g$. BET surface area for acid modified red mud was about 170 $m^2/g$. BET surface area for acid modified red mud with nickel in addition to or alternative to molybdenum loading is, in some embodiments, between about 50 $m^2/g$ and about 90 $m^2/g$, for example about 63 $m^2/g$ or about 89 $m^2/g$.

Catalyst testing. Several tests on red mud catalytic activity and ANMoMRM catalytic activity for dry reforming were experimentally conducted. Saudi Arabian red mud was tested as received as a catalyst support without any modifications, and it was placed in an Avantium Flowrence® catalyst testing reactor to perform dry reforming experiments. The Avantium Flowrence® reactor is a flexible, high-throughput catalyst testing system that was operated using about 0.5 g of catalyst samples. The ANMoMRM catalyst was tested in a Micromeritics® PID Eng & Tech brand microactivity reactor designed for catalyst activity and selectivity analysis. The results are compared, for example, in FIGS. 1 and 2. Results show that ANMoMRM catalytic activity for dry reforming is advantageously improved over non-modified red mud catalytic activity for dry reforming.

FIG. 1 is a graph showing conversion percentage for $CH_4$ in a dry reforming process for unmodified red mud used as a catalyst and for ANMoMRM used as a catalyst. Effects of nickel and molybdenum addition to red mud were studied. Experimental conditions in the dry reforming reactor included temperature at about 750° C., pressure at about 14 bar, and gas hourly space velocity (GHSV) at about 1477 $h^{-1}$. The test was conducted for 6 hours. Catalysts tolerant at high pressure are favored for dry reforming processes. The feed was 50 mol. % methane and 50 mol. % $CO_2$ for both catalysts tested. The GHSV was calculated for the mixed feed. GHSV generally measures the flow rate of the feed gases divided by the catalyst volume, which indicates the residence time of the reactants on the catalyst.

For dry reforming, the feed composition will include $CH_4$ and $CO_2$. In some embodiments for dry reforming, a feed will consist essentially of or consist of $CH_4$ and $CO_2$. Based on thermodynamics, the molar ratio of the feed for $CH_4$ to $CO_2$ can be about 1:1. However, some other embodiments showed that greater $CO_2$ concentrations up to 1:1.75 (mole $CH_4$ to mole $CO_2$) surprisingly and unexpectedly enhanced $H_2$ production.

Methane conversion illustrated in FIG. 1 shows ANMoMRM catalyst outperformed its counterpart, the untreated red mud. Methane conversion by ANMoMRM reached up to about 17%, and remained nearly constant at this level during the experiment's duration. On the other hand, unmodified red mud methane conversion maxed out at about 14%, then deteriorated. Slight conversion activity of unmodified red mud could be attributed to the existence of several transition metals within red mud, and the greater conversion rate of ANMoMRM can be attributed to the addition of nickel and molybdenum, and synergies of the nickel and molybdenum with the existing transition metals in the red mud.

Figure 2:
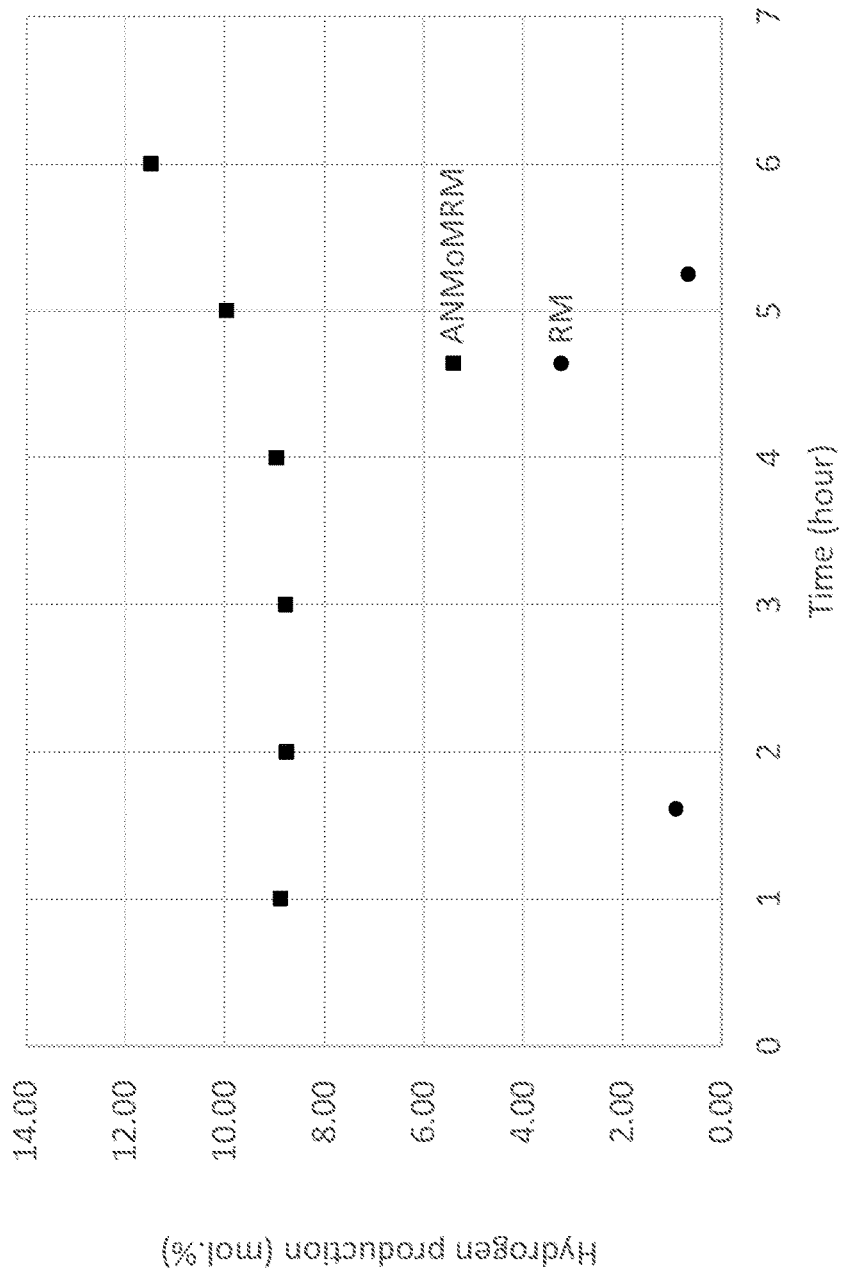
FIG. 2 is a graph showing mol. % of H$_2$ out of the total products produced from dry reforming of CH$_4$ in a dry reforming process for unmodified red mud used as a catalyst and for ANMoMRM used as a catalyst.

FIG. 2 is a graph showing mol. % of $H_2$ out of the total products produced from dry reforming of $CH_4$ in a dry reforming process for unmodified red mud (RM) used as a catalyst and for ANMoMRM used as a catalyst. Hydrogen production illustrated in FIG. 2 shows that untreated red mud produced low amounts of hydrogen, whereas ANMoMRM catalyst produced up to about 11 mol. % hydrogen. Nickel-molybdenum modification of red mud has enhanced the performance significantly for hydrogen production.

The singular forms "a," "an," and "the" include plural referents, unless the context clearly dictates otherwise. The term "about" when used with respect to a value or range refers to values including plus and minus 5% of the given value or range.

In the drawings and specification, there have been disclosed example embodiments of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

That claimed is:

1. A modified red mud catalyst composition, the modified red mud catalyst composition consisting of:
   red mud material produced from an alumina extraction process from bauxite ore, where the red mud material comprises aluminum oxide, calcium oxide, iron oxide, sodium oxide, silicon oxide, and titanium oxide such that the modified red mud catalyst composition includes between about 15 wt. % and about 30 wt. % $Al_2O_3$, between about 1 wt. % and about 5 wt. % CaO, between about 10 wt. % and about 30 wt. % $Fe_2O_3$, between about 1 wt. % and about 5 wt. % $Na_2O$, between about 10 wt. % and about 25 wt. % $SiO_2$, and between about 1 wt. % and about 10 wt. % $TiO_2$;
   nickel oxide, the nickel oxide present at between about 15 wt. % to about 25 wt. % of the modified red mud catalyst composition; and
   a Periodic Table Group VIB metal oxide, the Group VIB metal oxide present at between about 1 wt. % and about 30 wt. % of the modified red mud catalyst composition, where the Group VIB metal oxide comprises at least one metal selected from the group consisting of: chromium, molybdenum, and tungsten.

2. The modified red mud catalyst according to claim 1, where the modified red mud catalyst composition comprises particles having a particle size of less than about 70 μm.

3. The modified red mud catalyst composition according to claim 1, where the nickel oxide is present at about 23 wt. % of the modified red mud catalyst composition.

4. The modified red mud catalyst composition according to claim 1, where the Group VIB metal oxide is present at between about 1 wt. % to about 20 wt. % of the modified red mud catalyst composition.

5. The modified red mud catalyst composition according to claim 1, where the Group VIB metal oxide is present at between about 1 wt. % to about 10 wt. % of the modified red mud catalyst composition.

6. The modified red mud catalyst composition according to claim 1, where the Group VIB metal oxide is present at about 5 wt. % of the modified red mud catalyst composition.

7. The modified red mud catalyst composition according to claim 1, where Brunauer-Emmett-Teller (BET) surface area of the modified red mud catalyst composition is between about 50 m$^2$/g and about 90 m$^2$/g.

8. A method for producing the modified red mud catalyst composition of claim 1, the method comprising the steps of:
   a) dissolving red mud material produced from an alumina extraction process from bauxite ore in water to produce a red mud solution;
   b) neutralizing the pH of the red mud solution using an acid;
   c) preparing a nickel-containing solution, where the nickel-containing solution consists of nickel nitrate dissolved in ethanol;
   d) preparing a Periodic Table Group VIB metal oxide-containing solution, where the Group VIB metal oxide comprises at least one metal selected from the group consisting of: chromium, molybdenum, and tungsten;
   e) mixing the red mud solution, the nickel-containing solution, and the Group VIB metal oxide-containing solution to precipitate the modified red mud catalyst composition; and
   f) calcining the modified red mud catalyst composition, wherein the modified red mud catalyst composition provides constant methane conversion above about 13% between 1 hour and 6 hours and provides hydrogen production above 8% between 1 hour and 6 hours in dry reforming processes at molar ratios of $CH_4$ to $CO_2$ between about 1:1 and about 1:1.75.

9. The method according to claim 8, where the water comprises deionized water.

10. The method according to claim 8, where the acid comprises hydrochloric acid.

11. The method according to claim 8, where the Group VIB metal oxide-containing solution comprises ammonium molybdate dissolved in ethanol.

12. The method according to claim 8, further comprising filtering the modified red mud catalyst composition and drying the modified red mud catalyst composition before the step of calcining.

13. The method according to claim 12, where the step of drying occurs at about 100° C.

14. The method according to claim 8, where the step of calcining takes place for about 4 hours at between about 500° C. to about 700° C.

15. The method according to claim 8, where the step of calcining takes place for about 4 hours at about 600° C.

16. The method according to claim 8, further comprising the step of grinding the modified red mud catalyst composition to a particle size of less than about 70 μm.

17. The method according to claim 8, where Brunauer-Emmett-Teller (BET) surface area of the modified red mud catalyst composition is between about 50 m$^2$/g and about 90 m$^2$/g.

18. A method for dry reforming over a modified red mud catalyst composition, the method comprising the steps of:

providing a methane feed and carbon dioxide feed to react over the modified red mud catalyst composition at a temperature between about 500° C. to about 1000° C. and a pressure between about 5 bar and about 20 bar to produce synthesis gas comprising $H_2$ and CO, the modified red mud catalyst composition consisting of:

red mud material produced from an alumina extraction process from bauxite ore where the red mud material comprises aluminum oxide, calcium oxide, iron oxide, sodium oxide, silicon oxide, and titanium oxide such that the modified red mud catalyst composition includes between about 15 wt. % and about 30 wt. % $Al_2O_3$, between about 1 wt. % and about 5 wt. % CaO, between about 10 wt. % and about 30 wt. % $Fe_2O_3$, between about 1 wt. % and about 5 wt. % $Na_2O$, between about 10 wt. % and about 25 wt. % $SiO_2$, and between about 1 wt. % and about 10 wt. % $TiO_2$;

nickel oxide, the nickel oxide present at between about 15 wt. % to about 25 wt. % of the modified red mud catalyst composition; and a Periodic Table Group VIB metal oxide, the Group VIB metal oxide present at between about 1 wt. % and about 30 wt. % of the modified red mud catalyst composition, where the Group VIB metal oxide comprises at least one metal selected from the group consisting of: chromium, molybdenum, and tungsten.

19. The method according to claim 18, where the Group VIB metal oxide comprises at least one metal selected from the group consisting of: chromium, molybdenum, and tungsten.

20. The method according to claim 18, where the temperature is between about 600° C. to about 800° C.

21. The method according to claim 18, where the temperature is about 750° C.

22. The method according to claim 18, where the pressure is between about 10 bar and about 15 bar.

23. The method according to claim 18, where the pressure is about 14 bar.

24. The method according to claim 18, where the methane conversion rate is at least about 14% for at least about 6 hours.

25. The method according to claim 18, where the modified red mud catalyst composition comprises particles with a particle size of less than about 70 μm.

26. The method according to claim 18, where the nickel oxide is present at about 23 wt. % of the modified red mud catalyst composition.

27. The method according to claim 18, where the Group VIB metal oxide is present at between about 1 wt. % to about 20 wt. % of the modified red mud catalyst composition.

28. The method according to claim 18, where the Group VIB metal oxide is present at between about 1 wt. % to about 10 wt. % of the modified red mud catalyst composition.

29. The method according to claim 18, where the Group VIB metal oxide is present at about 5 wt. % of the modified red mud catalyst composition.

30. The method according to claim 18, where a molar ratio of the methane feed to the carbon dioxide feed is between about 1:1 and about 1:1.75.

31. The method according to claim 18, where produced $H_2$ is at least about 9 mol. % of produced products from the reaction.

32. The method according to claim 18, where Brunauer-Emmett-Teller (BET) surface area of the modified red mud catalyst composition is between about 50 $m^2/g$ and about 90 $m^2/g$.

\* \* \* \* \*